US010936511B2

(12) United States Patent
Atsatt et al.

(10) Patent No.: US 10,936,511 B2
(45) Date of Patent: Mar. 2, 2021

(54) ADDRESSABLE DISTRIBUTED MEMORY IN A PROGRAMMABLE LOGIC DEVICE

(71) Applicant: Intel Corporation, Santa Clara, CA (US)

(72) Inventors: Sean R. Atsatt, Santa Cruz, CA (US); Chee Hak Teh, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/232,834

(22) Filed: Dec. 26, 2018

(65) Prior Publication Data

US 2019/0129870 A1 May 2, 2019

(51) Int. Cl.
*G06F 13/16* (2006.01)
*G06F 13/40* (2006.01)
*G06F 13/28* (2006.01)

(52) U.S. Cl.
CPC .......... *G06F 13/1605* (2013.01); *G06F 13/28* (2013.01); *G06F 13/4027* (2013.01)

(58) Field of Classification Search
None
See application file for complete search history.

(56) References Cited

U.S. PATENT DOCUMENTS

| 5,642,489 | A | * | 6/1997 | Bland | G06F 1/3225 |
| | | | | | 710/22 |
| 6,457,072 | B1 | * | 9/2002 | Fairman | G06F 13/28 |
| | | | | | 710/22 |
| 6,757,776 | B1 | * | 6/2004 | Pew | G06F 13/385 |
| | | | | | 370/252 |
| 6,879,182 | B1 | * | 4/2005 | Agrawal | G11C 11/413 |
| | | | | | 326/30 |
| 9,716,491 | B2 | * | 7/2017 | Sharpe-Geisler | G06F 17/505 |
| 2013/0142066 | A1 | * | 6/2013 | Yamaguchi | H04L 49/109 |
| | | | | | 370/252 |
| 2015/0109024 | A1 | * | 4/2015 | Abdelfattah | G06F 17/5054 |
| | | | | | 326/41 |

* cited by examiner

*Primary Examiner* — Farley Abad
*Assistant Examiner* — Dayton Lewis-Taylor
(74) *Attorney, Agent, or Firm* — Fletcher Yoder, P.C.

(57) ABSTRACT

Systems and methods for providing capability of access to distributed memory blocks using a global address scheme in a programmable logic device. Each of the distributed memory blocks includes routing circuitry that receives data, and in a first mode, decodes whether the data is intended for a respective distributed memory block. In a second mode, the data may bypass routing circuitry. Furthermore, the data may be received at the distributed memory block via cascade connections of distributed memory blocks in a column and/or via register in the programmable fabric of the programmable logic device.

20 Claims, 6 Drawing Sheets

ADDRESSABLE DISTRIBUTED MEMORY IN A PROGRAMMABLE LOGIC DEVICE

BACKGROUND

This disclosure relates to decoding communication to or from memory circuitry of a programmable logic device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Programmable logic devices are a class of integrated circuits that can be programmed to perform a wide variety of operations. The highly flexible nature of programmable logic devices makes them an excellent fit for accelerating many computing tasks. Thus, programmable logic devices are increasingly used as accelerators for machine learning, video processing, voice recognition, image recognition, and many other highly specialized tasks, particularly those that would be too slow or inefficient in software running on a processor. As the computing tasks performed by the programmable logic devices become more complex, more flexible and faster interfaces for data exchange processes may be of benefit.

The programmable logic devices may include columns/rows of different blocks. For instance, the programmable logic device may include blocks of programmable logic fabric (e.g., field-programmable gate array (FPGA)) to implement operations and/or distributed blocks of memory (e.g., random access memory (RAM)) in the programmable logic device. The programmable logic device may use soft logic to access the memory blocks in the programmable logic device. However, the use of soft logic to move data in and out of the memory blocks may be an inefficient use of area and/or performance of the programmable logic device thereby negatively effecting overall system performance of any system utilizing the programmable logic device.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
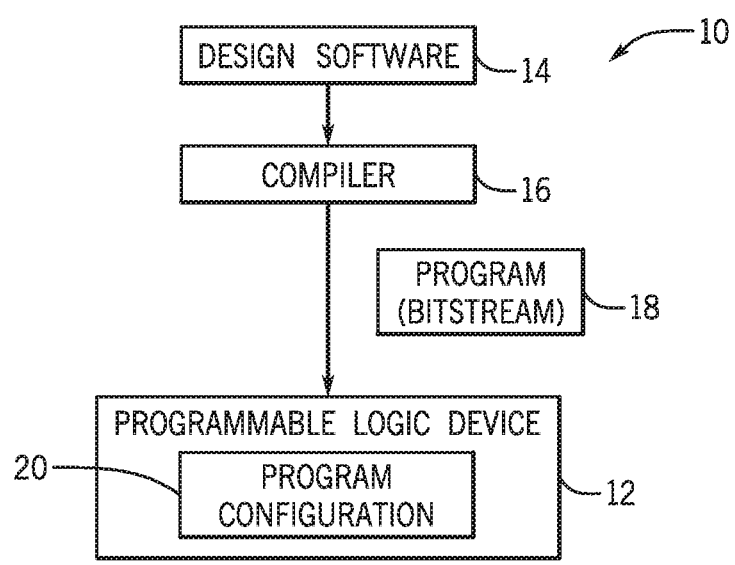
FIG. 1 is a block diagram of a programmable logic device that is programmed and uses addressable memory blocks, in accordance with an embodiment.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

The highly flexible nature of programmable logic devices makes them an excellent fit for accelerating many computing tasks. Programmable logic devices are devices that may include customizable and reprogrammable circuitry that can perform digital operations and/or logic functions. To that end, programmable logic devices may be programmed by loading configuration data into configuration memory (e.g., configuration random access memory (CRAM)) that may be embedded in the programmable fabric. The configuration memory may store a logic design (e.g., state machines, truth tables, functions, etc.) that may control configurable logic circuitry to facilitate performance of the programmed tasks. The flexibility in the operations of programmable logic devices also allows reprogramming of the configuration memory (e.g., programming a portion of a circuit design). For example, a system using programmable logic devices may change context (e.g., change the type of operation performed) by loading new configuration data to the configuration memory. Due to the flexibility afforded by the customizable and reconfigurable design, programmable logic devices are increasingly used as accelerators for machine learning, video processing, voice recognition, image recognition, and many other highly specialized tasks, particularly those that would be too slow or inefficient in software running on a processor. As the complexity of the tasks increase, the dimensions of the configuration data also increase, and may benefit from a high-speed interface for loading configuration memory.

As discussed above, programmable circuitry in the programmable logic device (e.g., configuration memory, programmable logic elements, and embedded memory) may send and receive data (e.g., configuration data, user data, incoming data for processing by the programmable logic elements, data processed by the programmable logic data elements). In some embodiments, soft logic may be deployed in the programmable logic blocks of the fabric of the programmable logic device to enable access to distributed memory blocks (RAM) blocks. However, using soft logic to move data in and out of distributed RAM blocks may be inefficient in terms of FPGA area and user logic performance (e.g., power consumption), thereby also limiting system performance especially as memory size increases by combining multiple memory blocks. Thus, in some embodiments, as discussed below, a global address may be used to identify a memory block in distributed memory blocks and a location in the memory using a data packet with headers that each memory block may use to determine whether a respective memory block is a target block for the data packet or if the data packet should be forwarded along. In other words, the programmable logic device provides pathways to make distributed memory to become part of a global addressable memory scheme without negatively interfering with the benefits of utilizing the distributed memory.

For instance, such routing may utilize available vertical cascade chaining in memory columns to introduce a path internal to the memory blocks to address individual memory blocks and transport data to and from individual memory blocks via a direct memory access (DMA) function embedded in NOC bridges connected to each memory column. By moving data using such a scheme, data movement from/to distributed memory may be improved.

With the foregoing in mind, the embodiments described herein are related to high-speed interfaces that may be used to read or write data into programmable circuitry in programmable logic devices. As discussed herein programmable circuitry may include embedded memory, such as configuration memory (e.g., CRAM), user memory (e.g., embedded random access memory (ERAM), M20K), and/or programmable fabric, such as intellectual property (IP) blocks, programmable logic elements, and other circuits implemented in the programmable fabric. In the present discussion, configuration data refers to data that may be loaded into the configuration memory or other embedded memory, and fabric data refers to data that is exchanged with the programmable fabric.

In certain embodiments, the programmable logic device may be composed of one or more die. For example, the programmable logic devices may include a first die that contains the programmable circuitry and a second die that contains fabric support circuitry, such as memory and/or communication interfaces. In such embodiments, the first die and the second die may be coupled via a high-speed interface that allows multi-purpose data exchange between the dies, and both the first die and the second die may include interface control circuitry. In order to provide access to different parts of the programmable circuitry, and in order to allow efficient data exchange with different data types (e.g., configuration data, fabric data, fabric data employing multiple protocols), the high-speed interface may implement multiple channels. Moreover, the channels may operate at any suitable frequency and/or clocking technique to match the number of microbumps in a channel and the bandwidth of the internal bus. The high-speed interface may be used to transport configuration data and fabric data. The high-speed interface may be implemented using a 2.5D or a 3D connection. The coupling through the interface may take place via a high-density connection (e.g., microbumps).

In some systems, in some embodiments the programmable logic die may be sectorized. In such systems, the fabric support circuitry in the single or base die may include network on chip (NOC) circuitry to send and/or receive data (e.g., configuration data, user data) with systems external to the programmable device and/or between sectors in the programmable devices. The fabric support circuitry may also include sector-aligned memory. In some embodiments, the sector-aligned memory may operate as a temporary storage (e.g., cache) for the configuration data or user memory. By incorporating the NOC into the fabric support circuitry, the NOC may resolve periphery shoreline bandwidth issues of the fabric while increasing the bandwidth of the fabric. In addition, the communication routes available via the NOC embedded in the fabric support circuitry may enable the fabric to implement design relocations or reconfigurations, provide alternate pathways around powered-down sectors of the fabric, and provide security isolation features. The NOC may be a source of configuration data and/or fabric data and may be integrated to access the multi-purpose high-speed interface.

In addition to the above-described features, the fabric support circuitry may include, among other things, a device controller (sometimes referred to as a secure device manager (SDM)), a sector controller (sometimes referred to as a local sector manager (LSM), region controller), a configuration network on chip (CNOC), data routing circuitry, local (e.g., sectorized, sector-aligned, region-aligned) memory used to store and/or cache configuration programs (bitstreams) or data, memory controllers used to program the programmable logic fabric, input/output (I/O) interfaces or modules for the programmable logic fabric, external memory interfaces (e.g., for a high bandwidth memory (HBM) device), an embedded processor (e.g., an embedded INTEL® XEON® processor by Intel Corporation of Santa Clara, Calif.) or an interface to connect to a processor (e.g., an interface to an INTEL® XEON® processor by Intel Corporation of Santa Clara, Calif.), voltage control circuitry, thermal monitoring circuitry, decoupling capacitors, power clamps, or electrostatic discharge circuitry, to name just a few circuit elements that may be present on the second die.

By way of introduction, FIG. 1 illustrates a block diagram of a system 10 that may employ a programmable logic device 12 that may utilize addressable memory blocks 13 that may be accessed by a programmable fabric 14 via a network-on-chip, via a programmable logic fabric of the programmable logic device 12, and/or via a cascade connection between the cascaded memory blocks. Using the system 10, a designer may implement a circuit design functionality on an integrated circuit, such as a reconfigurable programmable logic device 12, such as a field programmable gate array (FPGA).

The designer may implement a circuit design to be programmed onto the programmable logic device 12 using design software 15, such as a version of INTEL® QUARTUS® by Intel Corporation of Santa Clara, Calif. The design software 15 may use a compiler 16 to generate a low-level circuit-design defined by a bitstream 18, sometimes known as a program object file and/or configuration program, which programs the programmable logic device 12. Thus, the compiler 16 may provide machine-readable instructions representative of the circuit design to the programmable logic device 12. For example, the programmable logic device 12 may receive one or more configuration programs (bitstreams) 18 that describe the hardware implementations that are to be stored in the programmable logic device 12. A configuration program (e.g., bitstream) 18 may be programmed into the programmable logic device 12 as a configuration program 20.

The programmable logic device 12 may operate as a programmable logic device such as a field programmable gate array (FPGA) device. The programmable logic device 12 may be implemented using one or more die. For example, the programmable logic device 12 may include a fabric die and/or a base die that may operate in combination as an FPGA. Moreover, for the purposes of this example, the FPGA is referred to as an FPGA, though it should be understood that the device may be any suitable type of programmable logic device (e.g., an application-specific integrated circuit and/or application-specific standard product).

Figure 2:
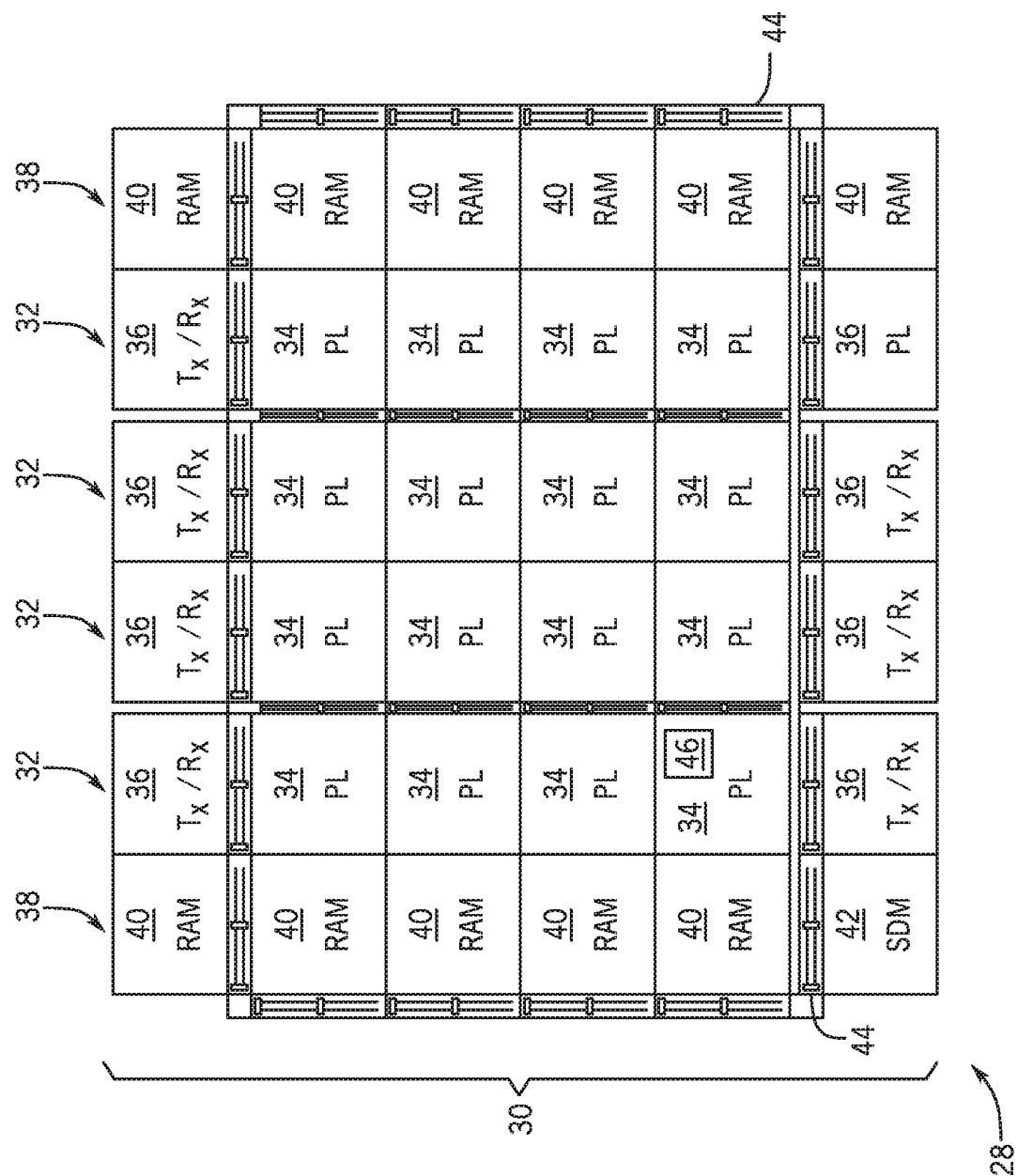
FIG. 2 is a block diagram of a portion of the programmable logic device of FIG. 1, in accordance with an embodiment.

As previously noted and as illustrated in FIG. 2, the programmable logic device 12 may include at least one portion 28 that includes one or more blocks 30 arranged into columns. For instance, columns 32 may include programmable logic blocks 34 with transceivers 36 to transmit data to and/or receive data from the programmable logic blocks 34. The transceivers 36 may be used to drive signals off of the FPGA and for receiving signals from other devices. The transceiver 36 may be part of the programmable logic device 12 or may be located in a separate die. In other words, the transceivers 36 may enable other devices and/or die to interact with the programmable logic device 12. The columns 38 may include RAM blocks 40 that may store information for use in and/or transport out from the programmable logic device 12.

The programmable logic device 12 may also include a secure device manager (SDM) 42 that enables security features in the programmable logic device 12. For example, the programmable logic device 12 may offer secure and flexible user-selected configuration control. In some embodiments, the SDM 42 may include a microprocessor block.

The programmable logic device 12 may also include a network-on-chip (NOC) 44. As illustrated, NOCs 44 may have vertical and/or horizontal paths connecting memory blocks 40 (referred to herein as RAM blocks) and programmable logic blocks 34. Interconnection resources (including the NOC 44) may be used to route signals, such as clock or data signals, through the FPGA. The FPGA may be sectorized, meaning that programmable logic resources may be distributed through a number of discrete programmable logic sectors.

Each programmable logic sector may include a number of programmable blocks 34 having operations defined by configuration memory (e.g., configuration random access memory (CRAM)). The programmable logic blocks 34 may include combinatorial or sequential logic circuitry. For example, the programmable logic blocks 34 may include programmable logic elements 46 that may include look-up tables, registers, multiplexers, routing wires, and so forth. A designer may program the programmable logic elements 46 to perform a variety of desired functions. There may be any suitable number of programmable logic sectors in the programmable logic device 12. In some embodiments, the programmable logic device 12 may include additional circuitry beyond that pictured, such as digital signal processing blocks and/or other memory types.

Figure 3:
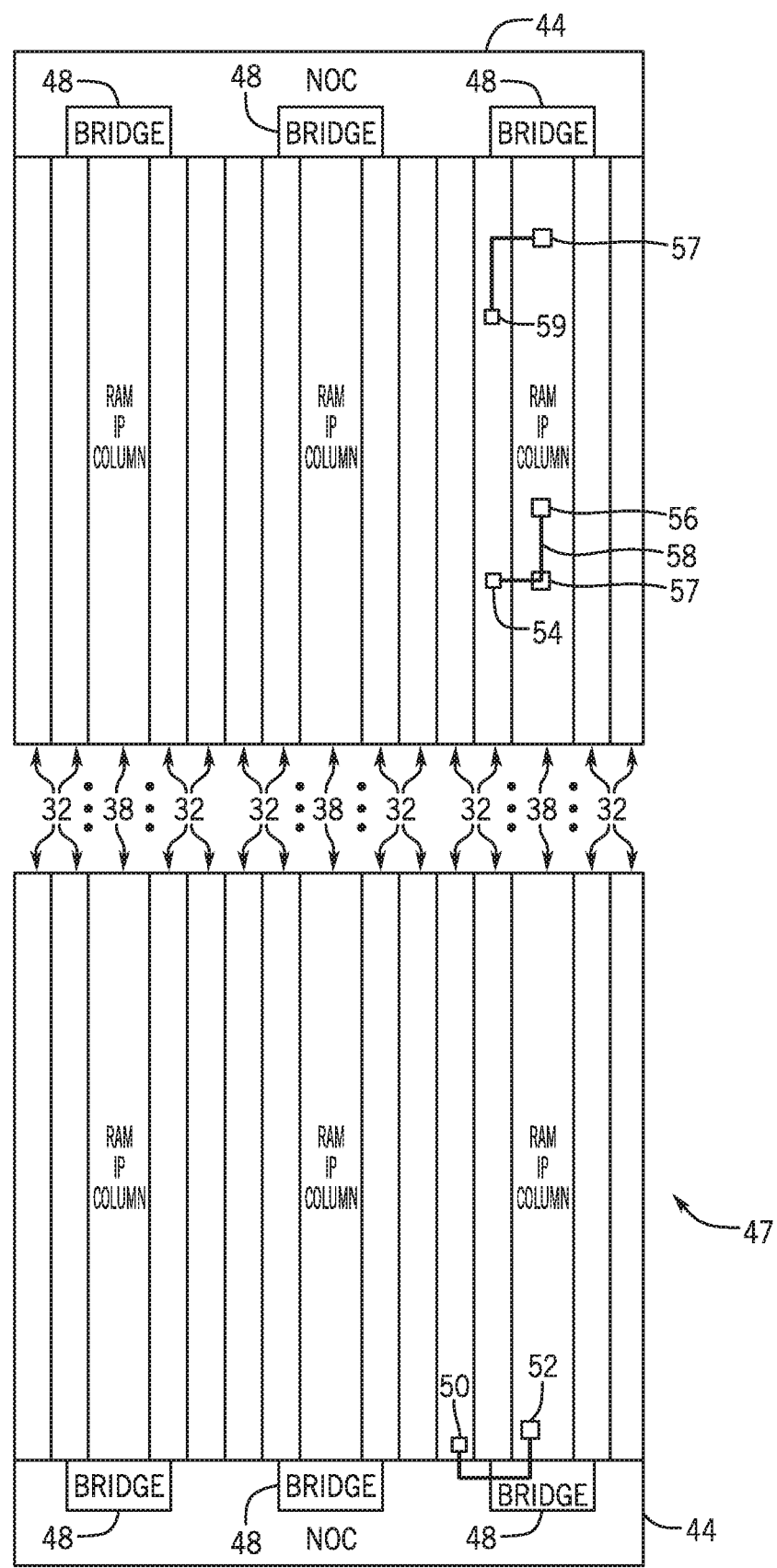
FIG. 3 is a block diagram of connections in a sector of the programmable logic device, in accordance with an embodiment.

FIG. 3 illustrates connections in a sector 47 between the columns 38 of RAM blocks 40 and the NOC 44 via corresponding bridges 48. The sector 47 may be located against the NOC 44 at the bottom and/or top of the sector 47. As illustrated, programmable logic block 34 in the columns 32 may communicate with memory in the RAM blocks 40. For instance, a programmable logic block 50 may communicate with a RAM block 52 via the NOC 44.

As addressed below, the NOC 44 transports system level address-based transactions to appropriate locations on the die. These transactions may have originated off die and/or from within the die. In some embodiments, each RAM block 40 in the column 38 is assigned an address within the memory space of the device. The bridge 48 converts transactions from the NOC 44 to the appropriate read or write transactions to access address ranges within each RAM block 40. The bridge 48 sends the write or read request up the column 38 as a packet after stripping the data from a format of transactions from the NOC 44 and reformatting the data. As discussed below, each RAM block 40 contains routing circuitry to decode whether the packet is addressed to it or not and to respond by either writing the packet data into itself and/or sending the data to a bridge 48 in a packet format. In some embodiments, the routing circuitry may replace the packet with the data (e.g., data field of the packet) read from packet and sending that data further up the column 38.

To accomplish such actions by the bridge 48, in some embodiments, one or more of the bridge 48 may contain a DMA controller that may be programmed to move the reformatted data from/to system memory and each RAM block 40 in a corresponding column 38.

Furthermore, in some embodiments, RAM blocks 40 in the columns 38 may be read at the same time they are being written allowing individual memories to serve as ping pong buffers or FIFO buffers for any location in system memory. Each RAM block 40 in the column 38 may include a FIFO controller that is able to message the DMA controller (e.g., in the bridge 48) in its column 38 when its FIFO pointers reach a programmable empty or full threshold.

In addition to or alternative to communications via the bridges 48, the programmable logic blocks 34 may communicate via different paths outside of the NOC 44. For example, a programmable logic block 54 may communicate with a RAM block 56 through an adjacent RAM block 57 in the column 38 that passes communications up (and/or down) a cascade connection 58 between the RAM block 56 and the RAM block 57. Furthermore, in some embodiments, the programmable logic blocks 34 may communicate with RAM blocks 40 through connections in the fabric. For example, a programmable logic block 59 may communicate with a RAM block 60 via fabric wires and registers (e.g., HIPI registers, logic array block (LAB) registers, and/or other fabric registers) of the programmable fabric of the programmable logic device 12. For instance, some registers (e.g., HIPI registers) may enable communication to travel within the fabric when a communication path is too long for passage into a multiplexer. Other registers (e.g., LAB registers) may be programmable registers within the programmable elements in the fabric. In other words, the HIPI registers provide registers in the fabric to move data through the fabric. In certain embodiments, the communications between the programmable logic blocks 34 and the RAM blocks 40 may selectively occur via the NOC 44, via the cascade connection 58 in the column 38, and/or via the fabric wiring and/or registers. To implement such flexibility, the RAM blocks 40 may include routing circuitry that may be used to route communications and/or determine whether communications received any of multiple inputs of a respective RAM block 40.

Figure 4:
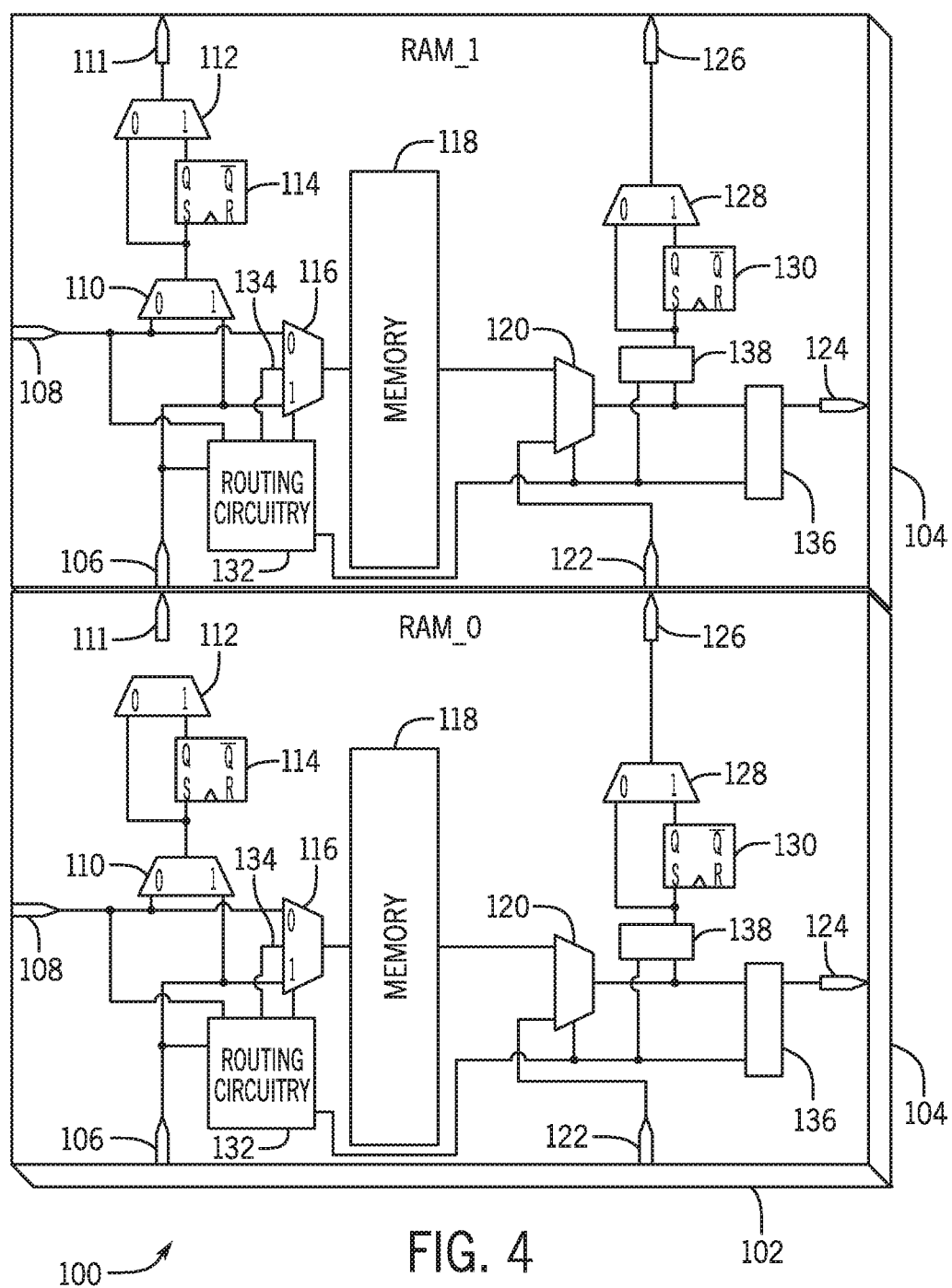
FIG. 4 is a schematic diagram of a memory block of the programmable logic device, in accordance with an embodiment.

For instance, FIG. 4 illustrates a schematic diagram 100 of a RAM block 102 and 104. As illustrated, the RAM blocks 102 and 104 may receive data via cascade inputs 106 from adjacent RAM blocks 40 in the column 38. Additionally, the RAM blocks 102 and 104 may receive data via fabric inputs 108 from the fabric of the sector 47. In each RAM block 102 and 104, a multiplexer 110 controls whether incoming data from the cascade input 106 or incoming data from the fabric input 108 is passed up to a cascade output 111. A multiplexer 112 may be used to control whether an optional delay is added to the output of the cascade output 111 choosing whether to bypass or include a latch 114 in the connection to the cascade output 111 from the multiplexer 110.

The RAM blocks 102 and 104 each include a multiplexer 116 that controls whether data from the cascade input 106 or the fabric input 108 is to be coupled to a respective memory 118. The memory 118 stores information from the cascade input 106 and/or the fabric input 108 via the multiplexer 116.

Each RAM block 102, 104 also includes a multiplexer 120 that controls whether data output from the memory 118 is passed toward an output 124 or a cascade output 126 to an adjacent RAM block 40 in the column 32. A multiplexer 128 may be used to control whether an optional delay is added to the output of the cascade output 126 choosing whether to bypass or include a latch 130 in the connection to the cascade output 126 from the multiplexer 120.

Additionally, the RAM blocks 102, 104 may each include routing circuitry 132 that senses data received at the cascade input 106 or the fabric input 108 and determines whether the data is targeted for the respective RAM block 102 or 104. For instance, the data may be encoded in a packet that has address headers that identify a specific RAM block 102, 104. When the respective RAM block 102, 104 is identified, the routing circuitry 132 determines that the RAM block 102, 104 is the target using packet sniffing, and the routing circuitry 132 ensures that the data is passed into the memory 118 using the multiplexer using data path 134. For instance, in some embodiments, the headers (and/or other overhead) in the data packet received at the RAM block 102, 104 may be removed so that a data payload is stored in the memory 118 while the overhead of the packet is not stored.

The routing circuitry 132 may also control gating of outputs of the respective RAM block 102, 104. For instance, when the RAM block 102 or 104 is selected, the corresponding routing circuitry 132 sends one or more signals to gating circuitry 136 and/or gating circuitry 138 to ensure that the selected RAM block 102 or 104 outputs data only when indicated in the packet as interpreted by the routing circuitry 132. For instance, in some embodiments, the gating circuitry 136 and/or the gating circuitry 138 may be an AND gate and the signal from the routing circuitry 132 may be logic high when the respective RAM block 102 or 104 is selected essentially causing the gating circuitry 136 and/or the gating circuitry 138 to act as a passthrough circuit when the respective RAM block 102 or 104 is selected. Otherwise, the gating circuitry 136 and/or the gating circuitry 138 may block transmission to respective output 124 and/or respective cascade output 126.

Figure 5:
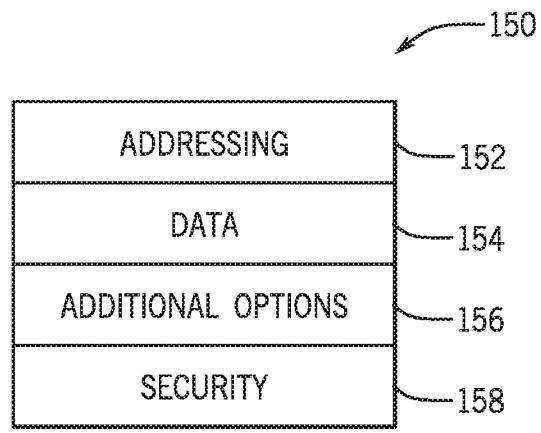
FIG. 5 is a block diagram of a packet of data passed in the programmable logic device, in accordance with an embodiment.

FIG. 5 is a depiction of an example data packet 150 that may be interpreted by the routing circuitry 132. The data packet 150 includes an addressing field 152 and a data payload field 154. In some embodiments, the data packet 150 may include additional option fields 156. For instance, the additional option field 156 may include one or more sub-fields for one or more other options. Furthermore, in some embodiments, the additional option field 156 may be grouped with the addressing field 152 as packet overhead. In certain embodiments, the data packet 150 may include a security field 158 that includes security data (e.g., hashes, keys, etc.) used to secure communications in the programmable logic device 12.

Figure 6:
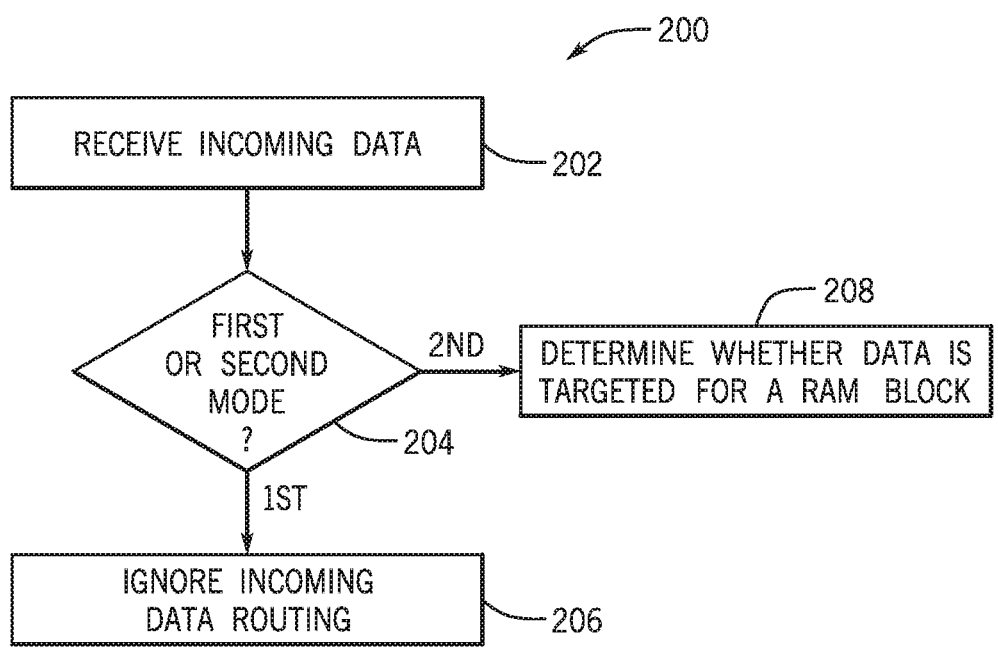
FIG. 6 is a flow diagram of a process using the addressable memory and routing circuitry in the programmable logic device, in accordance with an embodiment.

FIG. 6 is a flowchart diagram of a process 200 that may be used to route data to and/or from the RAM blocks 40 in the programmable logic device 12. The RAM block 40 in the column 38 receives incoming data (block 202). The routing circuitry 132 then determines whether the incoming data is transmitted by selecting between a first mode and a second mode (block 204). In the first mode, bypass the routing circuitry 132 in routing the incoming data by causing the routing circuitry 132 to ignore incoming data when transmitted with the first mode activated (block 206). In the second mode, the routing circuitry 132 determines whether the incoming data is targeted for the memory block (block 208). If the RAM block 40 is indicated in a header of the packet, the data may be stored in memory of the RAM block 40, but if the RAM block 40 is not indicated, the RAM block 40 may pass the data up the column 38 and/or discard the data.

The first and second modes may be selected using user logic (e.g., programmable logic elements 46). Specifically, the user logic may send control signals to the routing circuitry 132 and the bridge 48. The control signals may cause the routing circuitry 132 to ignore incoming data in the first mode operating in a default mode, and to cause the routing circuitry 132 to determine whether incoming data is targeted for the respective RAM block 40. Additionally or alternatively, the control signals may also cause the bridge 48 to dynamically route data only in the second mode. The control signals may be sent for specific RAM blocks 40 in a block-by-block manner.

Figure 7:
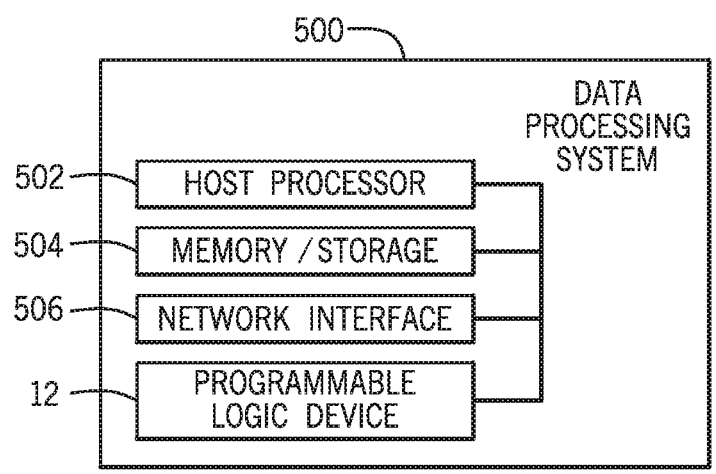
FIG. 7 is a block diagram of a data processing system that may use the programmable logic device to respond rapidly to data processing requests, in accordance with an embodiment.

With the foregoing in mind, the programmable logic device 12 may be a part of a data processing system or may be a component of a data processing system that may benefit from use of the addressable memory discussed herein. For example, the programmable logic device 12 may be a component of a data processing system 500, shown in FIG. 7. The data processing system 500 includes a host processor 502, memory and/or storage circuitry 504, and a network interface 506. The data processing system 500 may include more or fewer components (e.g., electronic display, user interface structures, application specific integrated circuits (ASICs)). The host processor 502 may include any suitable processor, such as an INTEL® XEON® processor or a reduced-instruction processor (e.g., a reduced instruction set computer (RISC), an Advanced RISC Machine (ARM) processor) that may manage a data processing request for the data processing system 500 (e.g., to perform machine learning, video processing, voice recognition, image recognition, data compression, database search ranking, bioinformatics, network security pattern identification, spatial navigation, or the like). The memory and/or storage circuitry 504 may include random access memory (RAM), read-only memory (ROM), one or more hard drives, flash memory, or the like. The memory and/or storage circuitry 504 may be considered external memory to the programmable logic device 12 and may hold data to be processed by the data processing system 500. In some cases, the memory and/or storage circuitry 504 may also store configuration programs (e.g., bitstream) for programming the programmable logic device 12. The network interface 506 may permit the data processing system 500 to communicate with other electronic devices. The data processing system 500 may include several different packages or may be contained within a single package on a single package substrate.

In one example, the data processing system 500 may be part of a data center that processes a variety of different requests. For instance, the data processing system 500 may receive a data processing request via the network interface 506 to perform machine learning, video processing, voice recognition, image recognition, data compression, database search ranking, bioinformatics, network security pattern identification, spatial navigation, or some other specialized task. The host processor 502 may cause the programmable logic fabric of the programmable logic device 12 to be programmed with a particular accelerator related to requested task. For instance, the host processor 502 may instruct that configuration data (bitstream) stored on the memory/storage circuitry 504 or cached in sector-aligned memory of the programmable logic device 12 to be programmed into the programmable logic fabric of the programmable logic device 12. The configuration data (bitstream) may represent a circuit design for a particular accelerator function relevant to the requested task. Due to the high density of the programmable logic fabric, the proximity of the substantial amount of sector-aligned memory to the programmable logic fabric, or other features of the programmable logic device 12 that are described here, the programmable logic device 12 may rapidly assist the data processing system 500 in performing the requested task. Indeed, in one example, an accelerator may assist with a voice recognition task in less than a few milliseconds (e.g., on the order of microseconds) by rapidly accessing and processing large amounts of data in the accelerator using sector-aligned memory.

The methods and devices of this disclosure may be incorporated into any suitable circuit. For example, the methods and devices may be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), and microprocessors, just to name a few.

Moreover, while the method operations have been described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of overlying operations is performed as desired.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . " it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. An integrated circuit device comprising:
a plurality of programmable logic blocks;
a plurality of distributed memory blocks comprising respective routing circuitry that receives data in a packet, wherein the respective routing circuitry is configured to decode whether the data is intended for storage on that respective memory block of the plurality of distributed memory blocks by:
selecting between a first mode and a second mode;
in the first mode, bypassing the respective routing circuitry in routing the data within the respective memory block and transmitting the data to an adjacent memory block of the plurality of distributed memory blocks; and
in the second mode, using the respective routing circuitry to perform packet sniffing of the data in the packet in the respective memory block to select between storing the data using the respective memory block and transmitting the data to an adjacent memory block of the plurality of distributed memory blocks;
a network-on-chip that provides a communication path to and from one or more of the plurality of programmable logic blocks and one or more of the plurality of distributed memory blocks; and
a bridge providing an interface between the network-on-chip and the one or more of the plurality of distributed memory blocks.

2. The integrated circuit device of claim 1, wherein the network-on-chip receives the data and transports the data into the plurality of distributed memory blocks arranged in a memory column.

3. The integrated circuit device of claim 2, wherein the bridge comprises a direct memory access controller.

4. The integrated circuit device of claim 3, wherein the bridge strips the data from the packet, reformats the data, and passes the reformatted data up the memory column as a direct memory access via the direct memory access controller.

5. The integrated circuit device of claim 3, wherein the bridge uses the direct memory access controller to control movement out of the memory column into the network-on-chip.

6. The integrated circuit device of claim 3, wherein a memory block of the plurality of distributed memory blocks comprises a FIFO controller that interacts with the direct memory access controller.

7. The integrated circuit device of claim 6, wherein the FIFO controller enables the memory block to be a FIFO for any location in system memory.

8. The integrated circuit device of claim 2, wherein transporting the data into the memory column comprises using a cascaded input of a memory block of the plurality of distributed memory blocks.

9. The integrated circuit device of claim 1, wherein a memory block of the plurality of distributed memory blocks that receives the data via the bridge receives subsequent data via one or more programmable logic blocks of the plurality of programmable logic blocks, and the respective routing circuitry for the memory controls whether the subsequent data is intended for storage on the memory block.

10. The integrated circuit device of claim 9, wherein receiving the subsequent data comprises receiving the subsequent data using a pipelined register in a fabric of the integrated circuit device that enables communications over a distance with a multiplexer via one or more of the plurality of programmable logic blocks.

11. The integrated circuit device of claim 9, wherein receiving the subsequent data comprises using a programmable register in a programmable element of a programmable logic block of the plurality of programmable logic blocks.

12. The integrated circuit device of claim 1, wherein the plurality of distributed memory blocks comprise a plurality of random-access memory blocks.

13. A method comprising:
receiving incoming data at a memory block in a column of memory blocks in a programmable logic device;
determining, using routing circuitry of the memory block, whether the incoming data is transmitted by selecting between a first mode and a second mode;
in the first mode, bypassing the routing circuitry in routing the incoming data within the memory block and transmitting the data to an adjacent memory block in the column of memory blocks; and
in the second mode, using the routing circuitry to perform packet sniffing of the data in the packet in the memory block to select between storing the data using the memory block and transmitting the data to an adjacent memory block in the column of memory blocks.

14. The method of claim 13, wherein a programmable logic element in a fabric of the programmable logic device controls whether the memory block expects the incoming data to be transmitted in using the first mode or the second mode.

15. The method of claim 14, wherein the routing circuitry receives control signals from the programmable logic element to indicate that the incoming data is transmitted in the first mode.

16. The method of claim 15, wherein the control signals are received at memory blocks in a memory column including the memory block on a per-memory-block basis.

17. The method of claim 16, wherein a bridge of a network-on-chip transporting the incoming data into the memory column receive bridge control signals from the programmable logic element to cause the bridge to ignore incoming data transmitted in the second mode.

18. The method of claim 17, wherein the bridge control signals are received at the bridge in a per-memory-block basis.

19. A programmable logic device, comprising:
one or more programmable logic columns comprising a plurality of programmable logic blocks in a programmable fabric;
one or more memory column comprising a plurality of memory blocks each comprising routing circuitry that causes the data to bypass the routing circuitry and transmit the data to an adjacent memory block of the plurality of memory blocks when the data is transmitted in a first mode;
a network-on-chip that provides a communication path to and from one or more programmable logic columns and the one or more memory columns; and
one or more bridges each providing an interface between the network-on-chip and a respective memory column of the one or more memory columns and that, when the data is transmitted in a second mode:
decodes the data in a packet and performs packet sniffing of the data in the packet in the respective memory block to select between storing the data using the respective memory block and transmitting the data to an adjacent memory block of the plurality of memory blocks;
strips the data from the packet;
reformats the data; and
passes the reformatted data up a memory column of the one or more memory columns.

20. The programmable logic device of claim 19, wherein each of the one or more bridges comprises a direct memory access controller, and the one or more bridges strip the data from the packet and pass the data using a direct memory access through cascade connections of the memory blocks of a respective memory column of the one or more memory columns.

* * * * *